United States Patent
Wade et al.

(10) Patent No.: US 8,719,063 B1
(45) Date of Patent: May 6, 2014

(54) SYSTEM AND METHOD FOR COMPARING INFORMATION IN A PROCESS FOR ISSUING INSURANCE POLICIES

(71) Applicant: Marsh USA Inc., New York, NY (US)

(72) Inventors: Claude Wade, New York, NY (US); Kathleen Kreuzer, New York, NY (US); Justin Walsleben, New York, NY (US); Rekha Sali, New York, NY (US); Rajeev Mahendru, New York, NY (US); Brian Elowe, New York, NY (US); Kristen Stokes, New York, NY (US)

(73) Assignee: Marsh USA Inc., New York, NY (US)

( * ) Notice: Subject to any disclaimer, the term of this patent is extended or adjusted under 35 U.S.C. 154(b) by 0 days.

(21) Appl. No.: 13/888,903

(22) Filed: May 7, 2013

(51) Int. Cl.
    G06Q 40/00 (2012.01)
    G06Q 40/08 (2012.01)

(52) U.S. Cl.
    CPC .................... *G06Q 40/08* (2013.01)
    USPC ............................................. 705/4

(58) Field of Classification Search
    CPC ...................................... G06Q 40/08
    USPC ............................................. 705/4
    See application file for complete search history.

(56) References Cited

U.S. PATENT DOCUMENTS

| | | | | |
|---|---|---|---|---|
| 4,831,526 | A * | 5/1989 | Luchs et al. | 705/4 |
| 5,446,653 | A * | 8/1995 | Miller et al. | 705/4 |
| 6,934,715 | B2 * | 8/2005 | Kalmes et al. | 707/694 |
| 7,028,047 | B2 * | 4/2006 | Boulmakoul et al. | 1/1 |
| 7,343,307 | B1 * | 3/2008 | Childress | 705/4 |
| 7,831,523 | B2 * | 11/2010 | Burchetta et al. | 705/80 |
| 8,335,701 | B1 * | 12/2012 | Syed et al. | 705/4 |
| 8,442,847 | B1 * | 5/2013 | Shrivastava | 705/4 |
| 2003/0018497 | A1 * | 1/2003 | Luedtke | 705/4 |
| 2003/0093302 | A1 * | 5/2003 | Quido et al. | 705/4 |
| 2006/0064330 | A1 * | 3/2006 | Sumino et al. | 705/4 |
| 2006/0116912 | A1 * | 6/2006 | Maes | 705/4 |
| 2006/0136274 | A1 * | 6/2006 | Olivier et al. | 705/4 |
| 2007/0088635 | A1 * | 4/2007 | King | 705/30 |
| 2008/0016099 | A1 * | 1/2008 | Ikeda | 707/102 |
| 2008/0183508 | A1 * | 7/2008 | Harker et al. | 705/4 |
| 2009/0037228 | A1 * | 2/2009 | Engel | 705/4 |
| 2009/0119133 | A1 * | 5/2009 | Yeransian et al. | 705/4 |
| 2009/0164258 | A1 * | 6/2009 | Broodryk | 705/4 |
| 2009/0210256 | A1 * | 8/2009 | Upadhyayula et al. | 705/4 |
| 2009/0281840 | A1 * | 11/2009 | Hersch | 705/4 |
| 2009/0287590 | A1 * | 11/2009 | Hahn-Carlson | 705/29 |
| 2010/0223078 | A1 * | 9/2010 | Willis et al. | 705/4 |
| 2010/0241463 | A1 * | 9/2010 | Corben et al. | 705/4 |
| 2011/0022419 | A1 * | 1/2011 | Ziade et al. | 705/4 |
| 2011/0119574 | A1 * | 5/2011 | Rogers et al. | 715/239 |
| 2012/0123808 | A1 * | 5/2012 | Jones et al. | 705/4 |
| 2012/0284058 | A1 * | 11/2012 | Varanasi et al. | 705/4 |
| 2013/0103431 | A1 * | 4/2013 | Concannon et al. | 705/4 |
| 2013/0110560 | A1 * | 5/2013 | Syed et al. | 705/4 |

* cited by examiner

*Primary Examiner* — Kenneth Bartley
(74) *Attorney, Agent, or Firm* — Fay Kaplun & Marcin, LLP (57) ABSTRACT

A system and method related to comparing information during a process for issuing insurance policies. The system has a database that stores a formatted submission for an insurance policy, the formatted submission comprising a plurality of insurance policy clauses and attribute information for an entity that desires to purchase the insurance policy, a user interface that receives information from an insurance company related to the formatted submission and a processor that compares the information received from the insurance company to the formatted submission and outputs comparison data based on the information and the formatted submission.

14 Claims, 8 Drawing Sheets

SYSTEM AND METHOD FOR COMPARING INFORMATION IN A PROCESS FOR ISSUING INSURANCE POLICIES

CROSS-REFERENCE TO RELATED APPLICATION

This application is related to application Ser. No. 13/888,811 entitled "System and Method For Issuing Insurance Policies" filed on the same date and naming the same inventive entity as the present application.

BACKGROUND

A typical insurance purchase or renewal includes receiving information from a client (the potential purchaser), submitting this information to one or more insurance companies and receiving a quote from the insurance companies for the requested coverage. The client selects one of the quotes and the insurance company issues a binder to the client evidencing that the insurance has been purchased and is in force. However, it may be several months until the client has the actual insurance policy in-hand and is able to review all the specific terms in the policy.

This leads to several issues for the client, the insurer and the insurance intermediary. For example, when the actual policy is received, there is a need to reconcile its terms with the agreed terms to verify that the terms in the actual policy are consistent with the agreement between the client and the insurance company. In another example, if a loss occurs in this intervening time frame between the issuance of the binder and having the actual policy in-hand, there may be uncertainty as whether the loss is covered. Thus, this lack of having the insurance policy at the time the coverage is bound by the insurance company, may lead to confusion and frustration between the client and the insurance company.

SUMMARY

A system having a database that stores a formatted submission for an insurance policy, the formatted submission comprising a plurality of insurance policy clauses and attribute information for an entity that desires to purchase the insurance policy, a user interface that receives information from an insurance company related to the formatted submission and a processor that compares the information received from the insurance company to the formatted submission and outputs comparison data based on the information and the formatted submission.

A method for storing, in a database, a formatted submission for an insurance policy, the formatted submission comprising a plurality of insurance policy clauses and attribute information for an entity that desires to purchase the insurance policy, receiving, by a user interface, information from an insurance company related to the formatted submission, comparing, by a processor, the information received from the insurance company to the formatted submission and outputting comparison data based on the information and the formatted submission.

DETAILED DESCRIPTION

The exemplary embodiments may be further understood with reference to the following description and the appended drawings, wherein like elements are referred to with the same reference numerals. The exemplary embodiments describe novel methods and systems for developing and issuing insurance policies. As will be described in greater detail below, the exemplary embodiments eliminate the need for insurance binders. Specifically, the client is provided with the insurance policy prior to the inception date of the policy, rather than a binder. From the client's point of view this eliminates the need to reconcile between the actual policy and the binder and creates certainty for both the insurance company and the client as to the terms of the insurance policy from the inception date of the insurance coverage.

Throughout this description, the process will be described as a renewal process. However, those skilled in the art will understand that the exemplary systems and methods may be equally applied to an initial purchase of an insurance policy. In addition, throughout this description, several parties will be referred to when describing the renewal process. These parties will be referred to as the client, the broker and the insurance company or companies. The "client" is the party that is attempting to purchase or renew the insurance coverage. The client may be any individual or entity such as a corporation, partnership, non-profit organization, school, government entity, etc. The "insurance company" is the party that will issue the insurance coverage. The "broker" is a third party that acts as a facilitator between the insurance companies and the client. The roles that each of these parties play in the renewal process will be described in greater detail below. However, it is not a requirement that each of these types of parties be involved in the process. For example, a sophisticated client may forgo the use of a broker and deal directly with insurance companies during the renewal process. In another example, the client may belong to a purchasing cooperative and the entity that negotiates and purchases the insurance policy is the cooperative. In a final example, a broker may have quoting and binding authority for an insurance company, meaning that the insurance company has limited involvement in the renewal process. From these examples, it should be clear that the parties' involvement and roles in the renewal process may vary.

Figure 1:
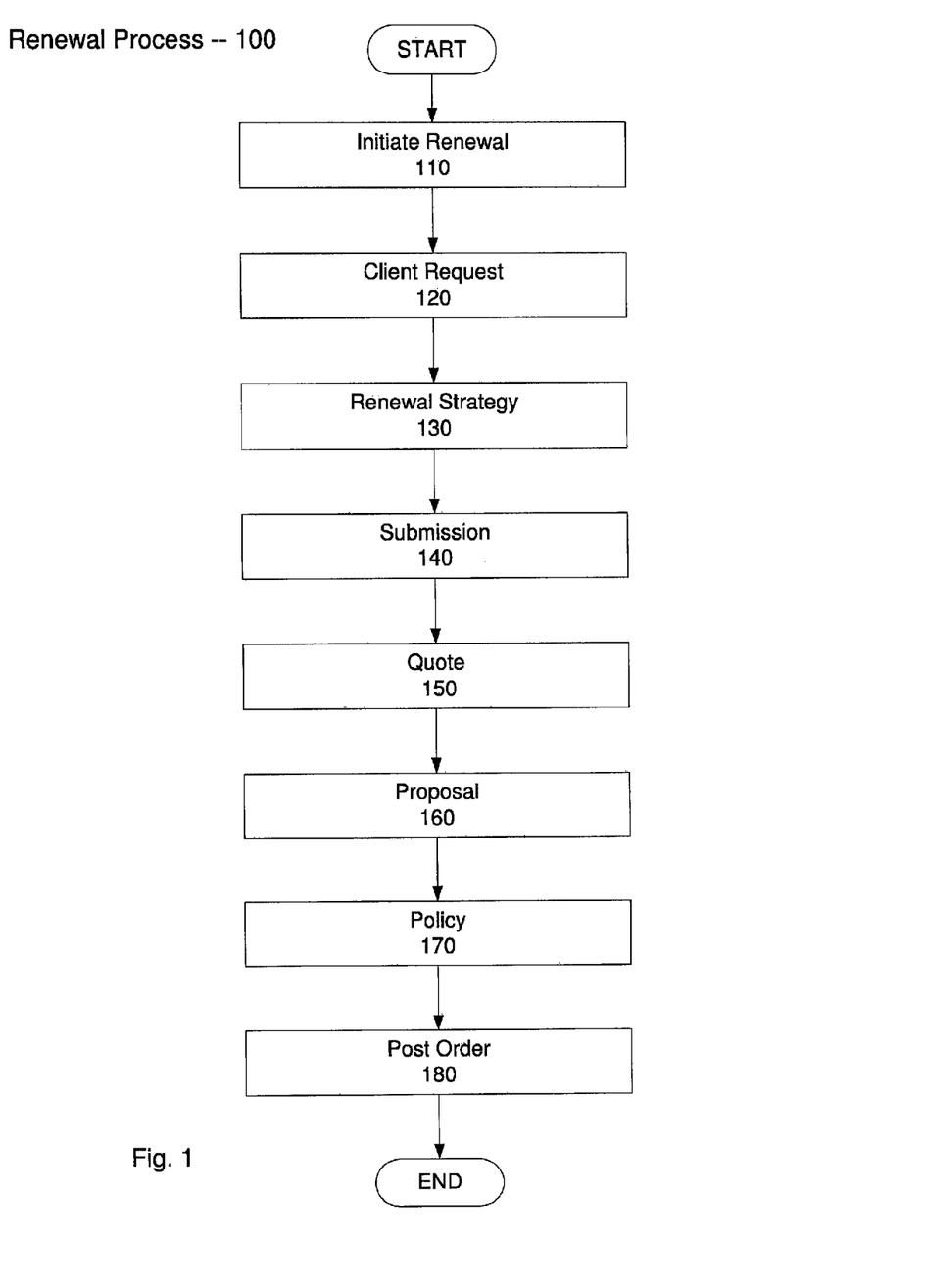
FIG. 1 shows an exemplary renewal process according to the exemplary embodiments.

FIG. 1 shows an exemplary renewal process 100. In step 110, the renewal process is initiated. In one example, the broker has a database listing all the policies for various clients and the renewal dates for these policies. The broker may identify the policies that are due for renewal within a predetermined time frame (e.g., in the next 3 months, 6 months, 1 year) and initiate the renewal process for these policies. Those skilled in the art will understand that the length of the lead-time needed for the renewal process will depend on many factors including the complexity of the insurance coverage that is being renewed. As will be described in greater detail below, the renewal workflow may be determined based on specific characteristics or criteria for the renewal. Examples of the characteristics and/or criteria will be provided below.

In step 120, the broker initiates contact with the client to determine whether the client desires to renew the policy. If the client desires to renew the coverage, the broker also collects information from the client regarding the policy and the client and its needs and requirements. For example, if the policy is a commercial auto liability policy, the broker may request the client to provide a list of vehicles that will be covered under the policy including make, model, year and the types of uses for the vehicles. In another example, if the policy is a workers compensation policy, the broker may request the client to provide a list of employees and their functions. Those skilled in the art will understand that each type of policy will require specific information from the client that will be provided to the insurance company for a quote.

In step 130, the broker formulates its recommendations for the renewal strategies for the client and receives the client's direction as to the renewal. For example, based on the information provided by the client to the broker in step 120, the broker may compile a list of insurance companies to which it recommends a submission should be made. For example, the broker may know that a particular insurance company desires to expand their business in the area of the renewal policy and the insurance company has been aggressively quoting similar policies. Therefore, this insurance company may be included on the list of suggested insurers to the client. In another example, the broker may know that another insurance company will not accept a certain type of risk based on the information provided by the client or by the insurance company. In this case, the broker will not include this insurance company on the list of suggested insurers. The broker will consult with the client who will ultimately decide the insurers to which the renewal should be submitted.

In the next step 140, the broker will prepare and submit the renewal to the insurance companies that the client has selected in the previous step 130. As will be described in greater detail below, the submission will include the same essential form as a bound insurance policy as well as information regarding the client and its requirements. The broker will format the submission using, for example, pre-negotiated policy forms or a library of policy forms.

In step 150, each of the insurance companies that decide to quote the submission will return their quotes to the broker. The quotes may include changes or mark-ups to the policy forms that are part of the submission. This step may also include negotiations on policy terms between the client and the insurance companies that may include the broker as a facilitator.

In step 160, the broker creates a proposal for the client that includes a summary of the quotes received. After receiving the proposal, the client, in consultation with the broker, will decide which one of the quotes the client desires to accept and inform the broker.

In step 170, the broker will generate an order to the selected insurance company. The selected insurance company will renew the policy and inform the broker that the policy has been renewed, who will, in turn, inform the client that the policy has been renewed. However, because the submission of step 140 included the policy form and because other specific terms may have been negotiated using this submission in the quoting step 150, in response to generating the order, the actual insurance policy will be available for delivery at this time (e.g., prior to the inception date). In this exemplary renewal process, there is no binder that is delivered to the client. Rather, upon renewal, the actual insurance policy is delivered to the client via the broker. Thus, from the inception date of the renewal period, the actual policy is in-hand and there is no uncertainty as to the policy's terms.

In step 180, post order functions are performed. Post order functions may include the broker generating the invoice for the client to pay, the broker collecting the premium from the client, and the broker checking the policy against the agreed terms. Thus, at the end of the renewal process 100, the client's insurance policy has been renewed and delivered prior to the policy inception date.

It should be noted that while the goal of the renewal process 100 is to deliver the insurance policy prior to inception, there may be circumstances that prevent delivery prior to inception such as a non-standard term or an additional rider that needs to be appended to the policy. Thus, while it is a goal of the exemplary systems and methods to deliver the policy prior to inception, it is not a requirement. However, even in cases where the policy is not delivered prior to inception, the exemplary systems and methods will decrease the time from inception to policy delivery.

It should also be noted that the above-described renewal process 100 is only exemplary and other renewal processes or steps may be used in conjunction with the exemplary systems and methods. For example, the renewal process may skip some of the steps described above or include additional steps. Some interactions between the broker and the client were described above. However, the renewal process may include more or less interactions between the broker and the client or between the broker and the insurer.

Figure 2:
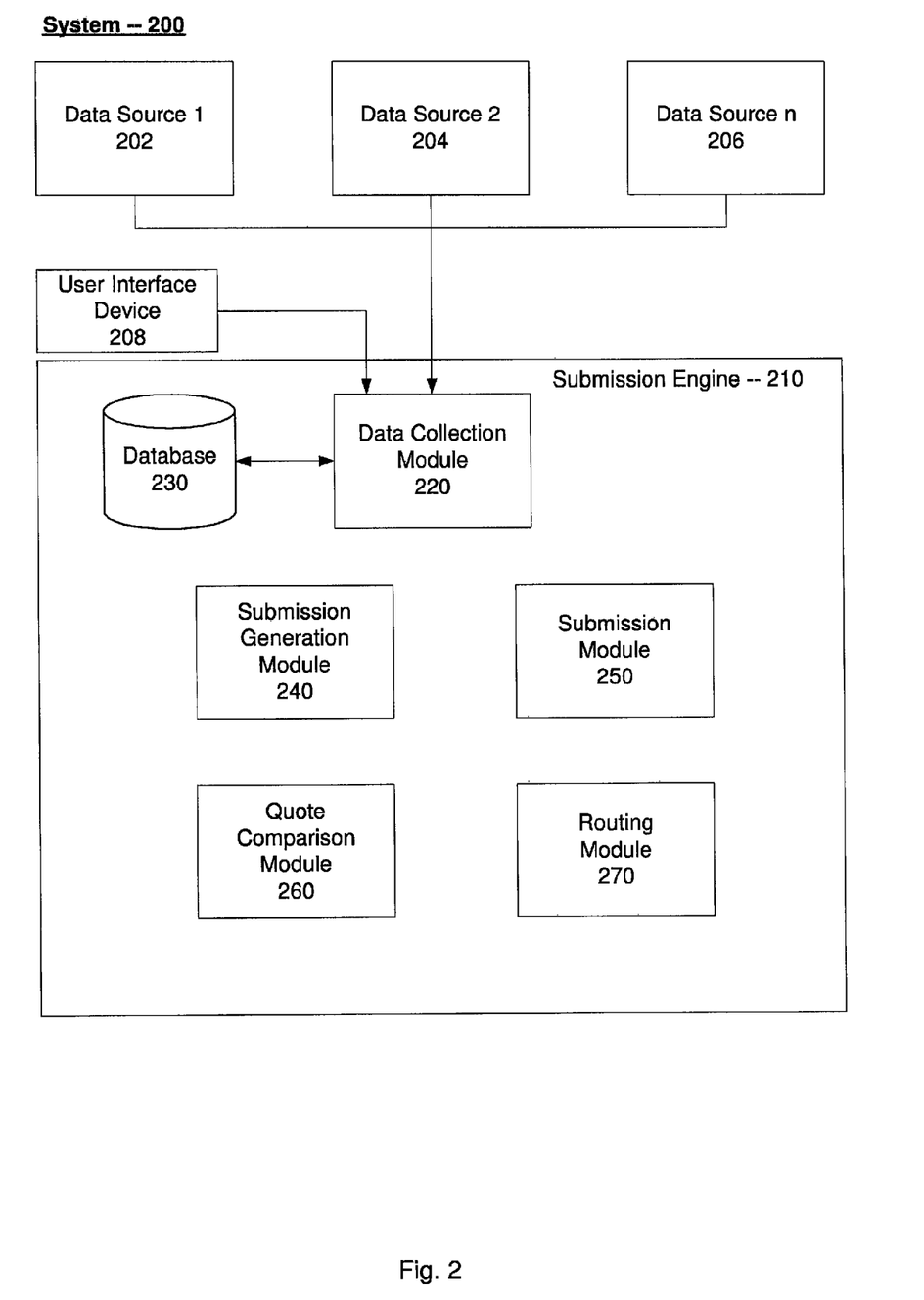
FIG. 2 shows an exemplary system for executing the exemplary renewal process.

FIG. 2 shows an exemplary submission system 200 for executing the exemplary renewal process. As described above, one of the functionalities that allows the exemplary systems and methods to generate and deliver the policy prior to or near the inception date is the submission that is provided to the insurance companies that includes an insurance policy form in a format that is very similar to the actual policy. The submission system 200 is an exemplary system that may be used to generate such a formatted submission. Throughout the remainder of this description, the term "formatted submission" will be used to describe a submission to an insurance company that is formatted to include an insurance policy form that would be issued by the insurance company. One way of considering the formatted submission is that it includes a draft policy that is submitted to the insurance company to obtain a quote for that draft policy. In the exemplary embodiments, it is considered that the submission system 200 (or at least the portion of the submission system 200 that generates the formatted submission) is under the control of the broker. This is because the broker is in a position to collect information, documents, requirements and instructions from the insurance companies and the clients that is used to generate the formatted submission. However, it is not a requirement that the submission system 200 be under the control of the broker.

The submission system 200 includes a series of data feeds 202-206 and a user interface device 208 that may be used to provide information, documents, requirements and instructions to a submission engine 210. It should be noted that the data feeds 202-206 may also be considered to be a "user interface device" in the context of this description. As will be described in greater detail below, the submission engine 210 will generate and output the formatted submission. However, before the formatted submission may be generated, the submission engine 210 is populated with general information and specific information for the insurance policy and client for which the submission is being generated. This information is provided via the data feeds 202-206 and/or the user interface device 208 to the data collection module 220 of the submission engine for storage in a database 230 or any other type of suitable storage medium. The submission engine 210 may be embodied on, for example, a server device or other computing device that is capable of executing the functionalities described below for the submission engine 210. The user interface device 208 may be any or a combination of the class of devices that are generally associated with a user interface such as a display, a touch screen, a keyboard, a mouse, a digitizer, etc. The functionalities of each of the components of the system 200 will be described in greater detail below.

In the first instance, the general information that is collected will be described. The general information is information for policies offered by each of the insurance companies and is used to create a product library. This information may include an identification of the insurance product (e.g., worker's compensation, general liability, catastrophic coverage, etc.) and specific information about each of these products such as policy forms, endorsements, policy riders, etc. The data collection module 220 will collect this information from each of the insurance companies and store this information in the database 230. The manner of collecting the information may be an automatic or a manual process. For example, the data feed 1 202 may be a data feed from a specific insurance company. The insurance company may send the information described above in a file (e.g., an XML file) to the broker via a network connection between the data collection module 220 and the data feed 1 202. In another example, an insurance company may not have the information in electronic format and may merely send the information in document form to the broker. In such a case, the broker may simply enter the information from the document or digitize the information in the document using the user interface device 208 so that the information may be stored in the database 230.

The data feeds 202-206 may also include internal data feeds to the broker or other entity that controls the submission engine 210. For example, a broker may have a set of endorsements for particular policies and this information may also be stored in the database 230. This may be useful in the situation where the specific insurance company for which a submission is being prepared is not included in the product library that is stored in the database 230. Thus, even in such a case, a formatted submission may still be generated based on the insurance company specific (or insurance policy specific) forms. Thus, the general information that is stored in the product library may be classified as being either insurance company specific forms for those insurance company for which data has been collected or insurance policy specific forms to be used for those insurance companies (or specific policies from insurance companies) for which data has not been collected.

As will be described in detail below, this general information will be stored and indexed in a specific manner in the database 230 for use in generating the formatted submission. It should also be noted that the collection and storage of this general information may be considered an ongoing process. That is, over time, it is likely that insurance companies will change the information initially collected (e.g., policy forms, endorsement, etc.), offer new product lines or discontinue product lines. Thus, as this information changes, the database 230 should be updated such that it includes the most current information and requirements for each of the insurance companies and their product offerings.

In addition to the general information, the submission engine 210 also needs specific information for the insurance policy and client that is to be renewed. This specific information may relate to general characteristics of the client such as name, address, type of entity, number of employees, etc. and also specific characteristics of the insurance coverage of the renewal such as loss information, exposure data, property locations and values, etc. Again, this information may be provided via one of the data feeds 202-204 or by the broker entering the data via the user interface device 208. The specific information is the type of information that is generally collected by the broker during the execution of the step 120 of the renewal process 100.

Thus, the data collection module 220 will collect both the general information and the specific information for storage in the database 230. This information may then be used to generate the formatted submission. It should be noted that there is no requirement for there to be specific timing for collecting the general information and specific information. As described above, the collection of the general information may be an ongoing process. With respect to the specific information, the broker may have collected and stored the general characteristics of the client (e.g., name, address, etc) at any time during past dealings with the client. With respect to the specific characteristics related to the insurance coverage that is being requested, this information may be collected during the time of step 120 as described above or may also be collected at or prior to the time of submission generation as will be described below. For example, the submission engine 210 may prompt the broker for the client specific characteristics when attempting to generate the formatted submission.

The above described specific and general information gathering was generally described with reference to the client request step 120 of the renewal process 100. However, prior to the performance of the step 120, there may be either specific or general information that is gathered by the broker or information that is currently in the possession of the broker and stored in the database 230 that is used in the initiate renewal step 110 of the renewal process. As was briefly described above, the renewal workflow will be determined based on specific characteristics or criteria for the renewal. This renewal workflow may depend on the complexity of the renewal which may based on the characteristics of the renewal and defined criteria for determining complexity. The renewal workflow may have different aspects. In one aspect, the renewal workflow determines a routing to a particular group within the broker. For example, there may be one group within the broker that handles workers compensation renewals that have premiums of less than $200,000, whereas a different group within the broker handles workers compensation renewals having premiums greater than $200,000. In this example, the complexity criteria is based on a premium threshold, but as will be described below, there may be many different criteria that are used to determine complexity. In other aspects, the renewal workflow may determine the Service Level Agreement (SLA) that is used for the renewal or a timeline that is used for the renewal. Those skilled in the art will understand that there may be other aspects to the renewal workflow that may be based on the complexity of the renewal.

Figure 8:
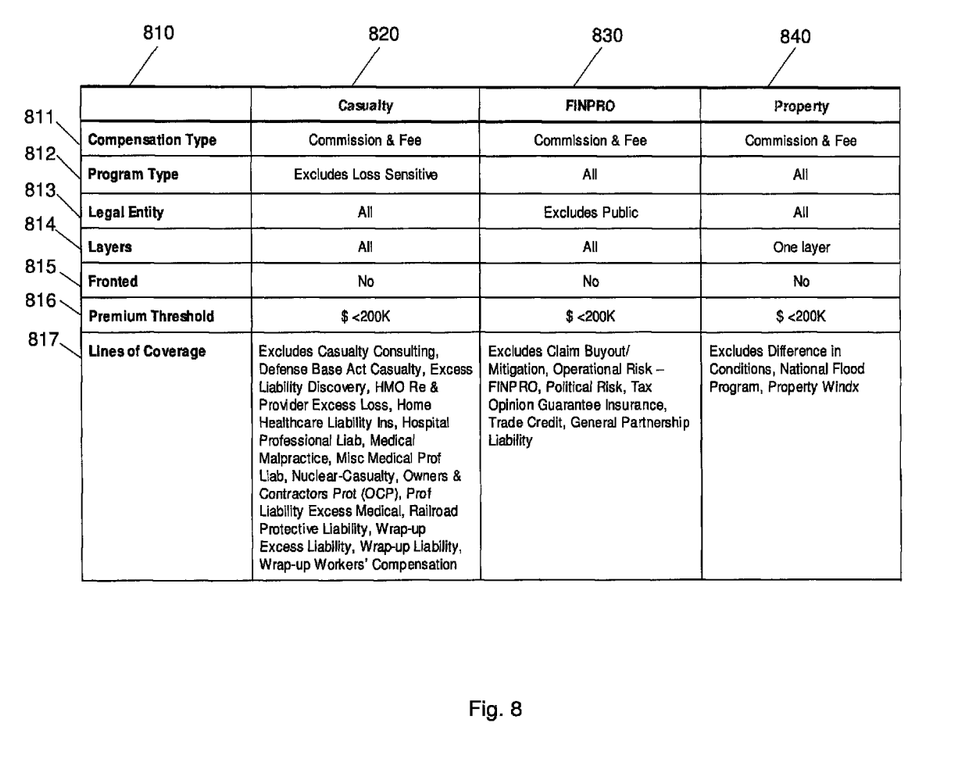
FIG. 8 shows a table that includes an example of predefined criteria for determining the complexity of a renewal.

Referring to FIG. 2, the submission engine 210 may include a routing module 270 that is used to determine the complexity of the renewal and the corresponding renewal workflow based on the determined complexity. As described above, the database 230 may include data for the renewal. The routing module 270 may access this data and determine the complexity of the renewal based on predefined criteria. FIG. 8 shows a table 800 that includes an example of predefined criteria for determining the complexity of a renewal. The table 800 shows the criteria type 810 (e.g., compensation type 811, program type 812, legal entity 813, layers 814, fronted

815 and premium threshold 816) for three general categories of insurance, Casualty 820, Finpro 830 and Property 840. The specific lines of coverage are further defined in the row 817 labeled "Lines of Coverage."

In this example, there are two different levels of complexity for each of the categories of insurance 820-840. The first level is those renewals that fit into the defined criteria. The second level is those renewals that do not fit into the defined criteria. For example, a casualty renewal that has a compensation type 811 of commission and fee, a program type 812 that is not loss sensitive, the client is any type of legal entity 813, the coverage is in any layer 814, it is not a fronted 815 renewal and the premium threshold 816 is less than $200,000 would be considered as being included in the first level of complexity and would be assigned a renewal workflow commensurate with this level of complexity. For example, the routing module 270 would determine the values for each of the criteria types 810 and based on these values assign the renewal to the first or second level of complexity for the insurance category 820-840 and then assign the appropriate renewal workflow based on the determined level of complexity. As described above, the selected renewal workflow may determine different aspects of the renewal such as the broker group to which the renewal is assigned, the SLA that governs the renewal, the timeline for the renewal, etc.

It should be noted that in the above example criteria of table 800, the complexity decision is a binary decision (e.g., complexity level 1 or 2). It is possible to set up more levels of complexity based on the criteria types 810. For example, the legal entity may have three different general types (e.g., incorporated businesses, unincorporated businesses (partnerships, etc) and individuals) that each lead to a different level of complexity (e.g., three different levels instead of two). It is also noted that the criteria types 810 are only exemplary and that either additional criteria types or less than the listed criteria types may be used to determine the level of complexity.

Thus, prior to the data collection of step 120 in the renewal process 100 for building the formatted submission, the routing module 270 of the submission engine 210 may determine the renewal workflow for the individual renewal. This renewal workflow may impact the formatted submission by selecting the parameters for the renewal process such as the SLAs and timelines to be used for the renewal process and the group within the broker that will be responsible for the renewal.

Figure 3:
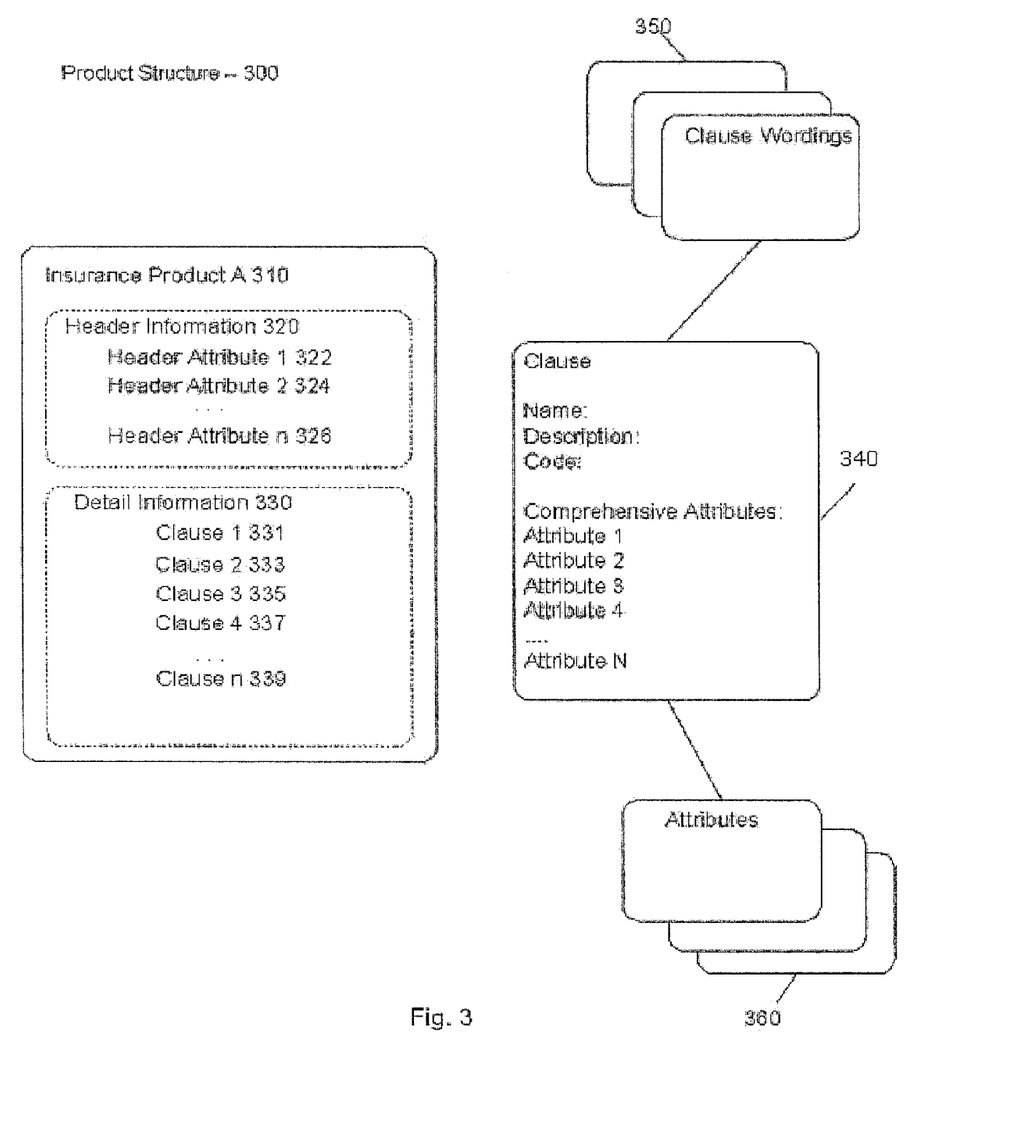
FIG. 3 shows an exemplary product structure for storing insurance product information.

Prior to discussing the generating of the formatted submission, the following will provide a brief description of the formatting and indexing of the general information that is stored in the database 230 of the submission engine 210. FIG. 3 shows an exemplary product structure 300 for storing insurance product information. The product structure 300 includes an identification of the insurance product 310 (e.g., worker's compensation, general liability, commercial auto, etc), as well as mandatory and optional provisions. The product structure 300 further includes header information 320 including a series of header attributes 322-326. The attributes may include information such as limits, deductibles, exposure, premium, wordings, etc. It is noted that the product structure 300 does not include actual values for the header attributes 322-326, but rather includes the listing of the attributes that may be needed to generate the formatted submission for the particular insurance product 310. For example, if the insurance product 310 is a general liability product, the attribute 322 may be the deductible. Thus, if a broker were to be creating the formatted submission for a general liability product, the broker may need to provide a value for the deductible requested by the client.

The product structure 300 also includes detail information 330 including clauses 332-339. Each insurance product may have any number of clauses. The product structure 300 shows all the possible clauses that may be included in the formatted submission for the insurance product 310. Those skilled in the art will understand that not every clause needs to be included in the formatted submission, only those that are desired by the client for the particular coverage. The purpose of the product structure 300 is to store clause possibilities so that the broker and client may select those that are desired by the client. Throughout the remainder of this description, the term "clause" should be understood to mean insurance policy form(s), insurance policy endorsement(s) and/or any other language that is included in an insurance policy. Thus, the product library stored in database 230 includes, by product offering by insurance company, a product structure 300 that identifies the product 310 and possible header information 320 and detailed information 330.

Each clause 332-339 also has a data structure 340 that includes specific information for the individual clause. This specific information includes for example, the name, description and code of the clause and a comprehensive list of attributes for the clause. This detailed information also includes the clause wording 350 for each insurance form. For example, a general liability product offered by an insurance company may have different forms for the same clause depending on the specific coverage and these different forms may have different clause language. Thus, the product library includes an index 350 that relates the specific clause language to the particular form that is being used. Similarly, this detailed information for each clause also includes the attribute indicators 360 that are applicable to a given insurance form. As shown in data structure 340, the comprehensive list of attributes includes attributes 1, 2, 3, 4, . . . N. However, a specific form for this clause may only include attributes 1 and 3. Thus, an index 360 relates the specific attributes to the particular form that is being used.

It should be noted that the product structure 300 is only used to demonstrate the type of information that is stored for each insurance product. It is not meant to indicate that each insurance product includes a specific data structure as shown in FIG. 3. Those skilled in the art will understand that any type of storage mechanism may be used to store and relate the information such as the header attributes and clauses to a particular insurance product such as relational or other types of databases, tables, arrays, etc. For example, multiple insurance companies may have the same boilerplate clause for a particular insurance product. It is not necessary to store the same clause multiple times for each insurance company. Rather, the clause may be stored a single time and may be related or indexed to the insurance product for the multiple companies. The data requirements and structure may vary based on the product, risk profile and exposure and transaction complexity and be saved and re-used accordingly.

The submission engine 210 also includes a submission generation module 240 that is used to generate the formatted submission. As described above, in step 130 of the renewal process 100, the client will select the list of insurance companies to which the submission should be made. Once the selection has been made, the submission engine 210 will generate the formatted submissions for each insurance company. In this example, generating a formatted submission for a single insurance company will be described. However, it should be apparent that the same process may be repeated to generate formatted submissions for multiple insurance companies.

To prepare the formatted submission for a selected insurance company, the broker will initially select the insurance company and product. The user interface device 208 may display a table, drop-down menus, or any other manner of user interface from which the broker may select the insurance company and product for which the submission is being prepared. There are a number of manners of generating the formatted submission, several examples of which are provided below. In a first example, as part of the general information that is stored in the database 230, a policy template for each insurance product is stored. That is, the submission generation module 240 receives the selection of the insurance company and insurance product from the broker and queries the database 230 to find the template associated with these selections. This template is then displayed to the broker via the user interface device 208.

Figure 4:
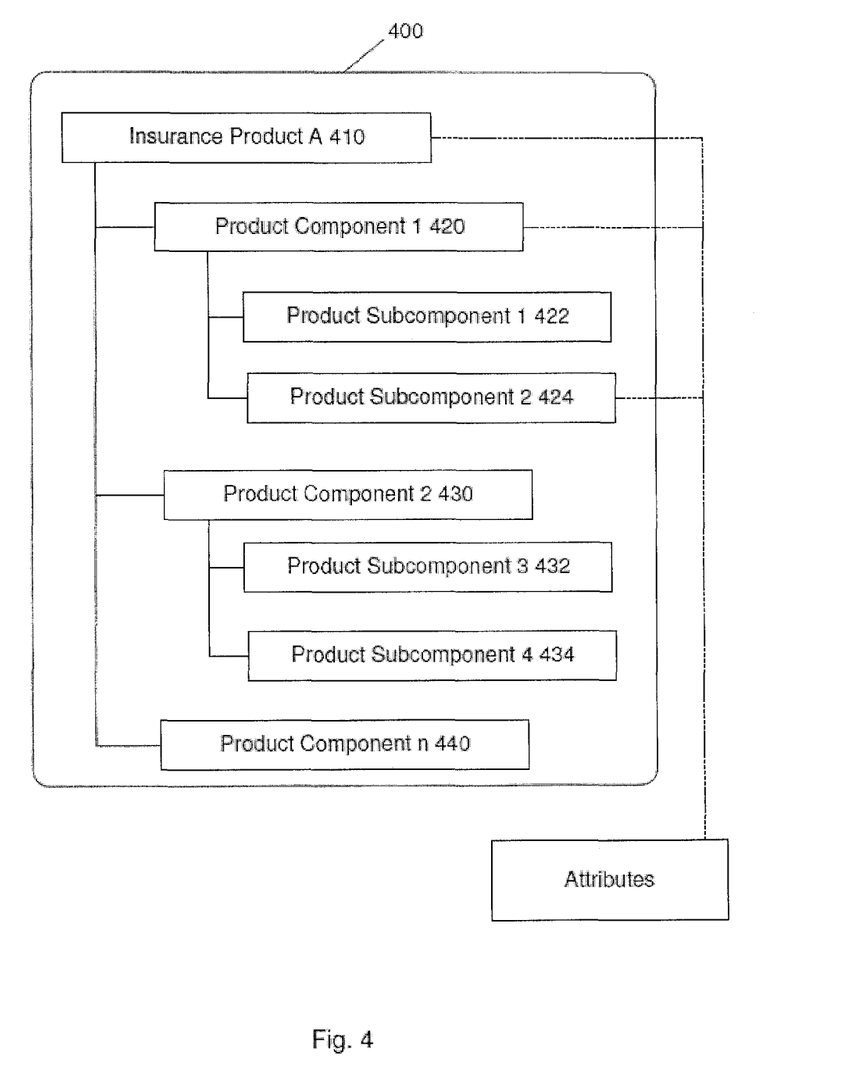
FIG. 4 shows an exemplary product tree for an exemplary insurance product A.

FIG. 4 shows an exemplary product tree 400 that may be used to build a template for an exemplary insurance product A 410. The product tree 400 is generic to all insurance products for all insurance companies. That is, all insurance products may be built from a series of product components and sub-components arranged in the tree fashion as illustrated by FIG. 4. As will be described in greater detail below, the building of the insurance products using such a format allows for the exemplary systems and methods to compare different policies offered by different insurance companies.

Referring to the example of FIG. 4, the exemplary insurance product A 410 includes a product component 1 (420), a product component 2 (430) and a product component n (440). The product component 1 (420) includes a subcomponent 1 (422) and a subcomponent 2 (424), while the product component 2 (430) includes a subcomponent 3 (432) and a sub-component 4 (434). To provide a specific example, it may be considered that the insurance product A 410 is a commercial auto insurance product. In such a case, the product component 1 (420) may be a comprehensive coverage, the product component 2 (430) may be a collision coverage and the product component n (440) may be a liability coverage. In this example, the sub-component 3 (432) of the collision coverage may be rental reimbursement coverage. Thus, as seen by this example, a template for various insurance products may be built using the product tree 400. Those skilled in the art will understand that each insurance product may have any number of components and subcomponents and the number shown in the template 400 for insurance product A 410 is only exemplary and a potentially unlimited number of components and subcomponents may be included. For example, those skilled in the art will understand that a commercial auto insurance product has many more than three product components.

In addition to the product components and subcomponents, the template may also include the attributes associated with the components and subcomponents. As described above, the broker, when creating the formatted submission may need to provide values for these attributes (e.g., deductible amounts). In the example of insurance product A 410, the insurance product A 410, the product component 1 (420) and the sub-component 2 (424) have associated attributes. Those skilled in the art will understand that some of the components and/or subcomponents may be clauses that do not have associated attributes (e.g., a clause that states a specific coverage term).

The policy template may be generally considered to be a template that may be negotiated between the broker and the insurance company as including those components/subcomponents that are offered by the insurance company for a particular insurance product (e.g., insurance product A 410). It is not a requirement that there be a negotiation between the broker and the insurance company. For example, an insurance company when providing the product information (e.g., attribute and clause information described above with respect to FIG. 3) may also provide a template for the particular type of insurance product for which the information is being provided. In another example, the broker may be preparing a formatted submission for an insurance company that has not provided information. In this example, the broker may have a specific template that it has developed for the particular insurance product. In addition, a broker may have a panel arrangement with insurers. A panel is a pre-selected group of insurers from which quotes will be sought for a particular type of risk and\or client and generally have committed to issue policies on pre-agreed terms. Thus, when the broker selects the particular type of risk and/or client, the associated templates for the panel members may be automatically selected for use to build the submission.

In a further example, the broker may build out templates across insurers for multi participation/policy programs. For example, it is common for a Directors and Officer's insurance policy or program to be a layered program with several insurers or a quota/layered program for All Risk Property insurance policies with multiple insurers. Thus, these types of programs may have templates that cover multiple insurance companies' products and clauses.

Thus, from these examples, it should be seen that there may be many different templates for the same insurance products. Carrying through with the example of the commercial auto insurance product, the database 230 may have a generic template for the product that is developed by the broker, and a series of additional templates related to different insurance companies (e.g., insurance company A, B, C, etc.) and each of these templates may have varying components and subcomponents. However, the tree product structure 400 will be the same for each of these templates.

Once the broker has selected the correct insurance product, the associated product template may then be displayed to the broker via the user interface device 208. This display may be in the form of the product tree 400 or may take any form such as a series of screens showing each component and/or sub-component of the insurance product template. The submission engine 210 will use the template to build the formatted submission for the specific insurance product requested by the client.

Figure 5:
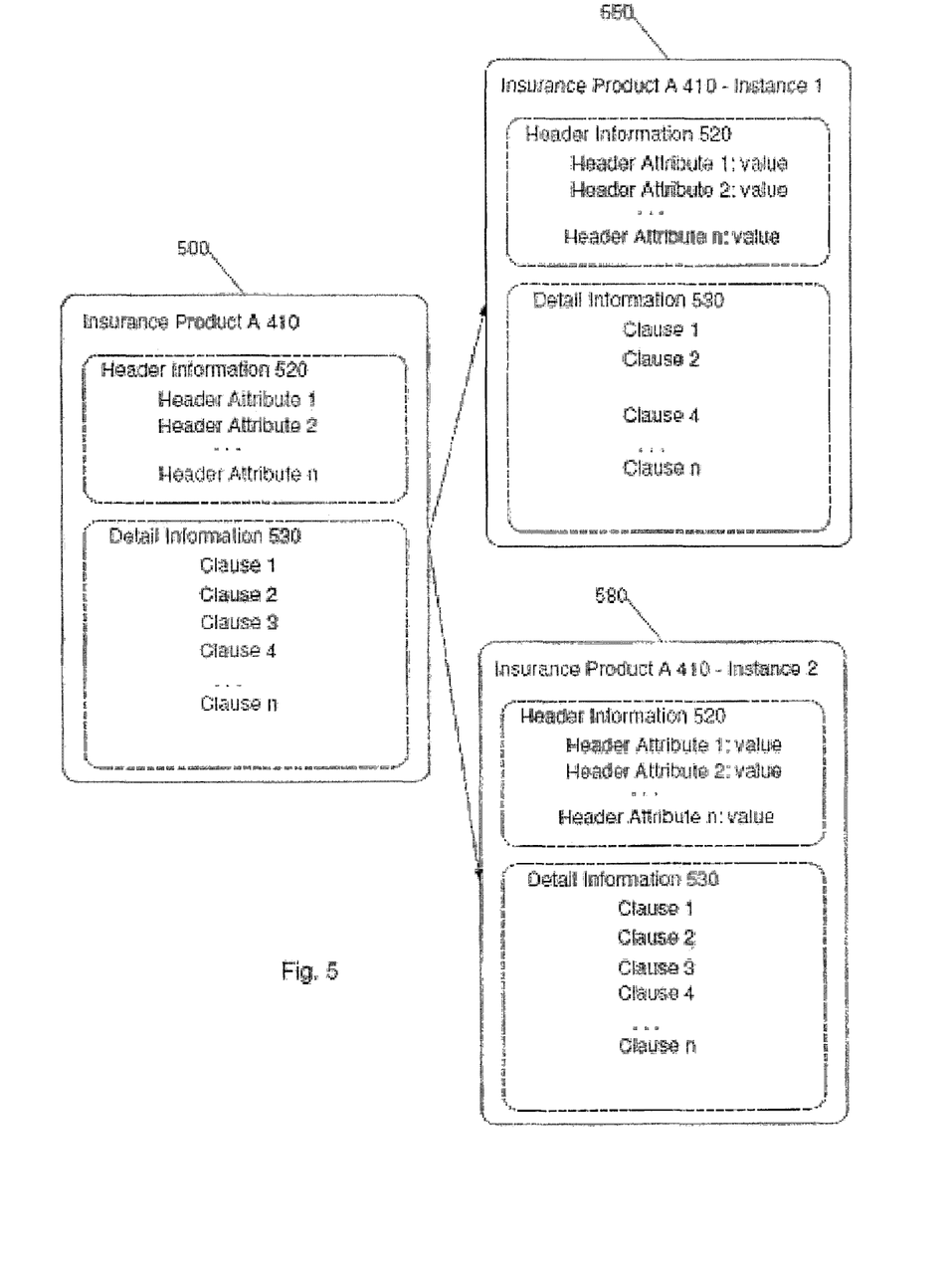
FIG. 5 shows an example of a selection page that may be used by a broker when building a formatted submission.

FIG. 5 shows an example of a selection page 500 that may be used to build a formatted submission. In this example, it will be considered that the insurance product A 410 that is offered by an insurance company X has been selected. The selection screen 500 will be used to generate formatted submissions 550 and 580. As will be described in greater detail below, the formatted submissions 550 and 580 are the actual submissions that will be submitted to the insurance company X to obtain a quote from the insurance company. There are two different formatted submissions 550 and 580 to illustrate that the submission engine 210 may build different formatted submissions for the same insurance product A 410 for different clients.

As described above, the insurance product A 410 offered by insurance company X has an associated template. The selection page 500 is related to this template. In this example, the selection page 500 corresponds to a first screen of the template that is related to the highest level of the insurance product A 410 as shown in FIG. 4. The broker will use the selection page 500 to build the formatted submission for the insurance product A 410. It should be understood that there may be a series of similar selection pages that may be displayed for each of the product components 420, 430 and 440 and subcomponents 422, 424, 432 and 434 of the template for the insurance product A 410 offered by insurance company X.

In this example, the broker is prompted for values for the header attributes area 520. As described above, this attribute information may have been previously saved to the database 230 or the broker may enter the requested information via the user interface device 208. Since this is the most upper level portion of the product template, some of the header attributes 520 may be specific information about the client such as name, address, location of insurance coverage, exposure type, etc. In the lower level components, the attributes may be information such as limits, deductibles, premiums, etc. In any case, the broker will enter (or retrieve) the attribute information and this information will be stored in the formatted submission 550. As shown in FIG. 5, formatted submission 550 includes the insurance product A 410 and the header attributes and actual values for these attributes.

The submission generation module 240 may include logic that selects the correct policy clauses and/or forms based on the attribute information provided by the broker. The clauses that are displayed in the detail information portion 520 may change based on the attribute information provided by the broker. For example, there may be clauses that are related to specific geographic locations, industries and/or other risk exposures and the entering of the insurance location, industry and/or risk exposure as an attribute, may cause different clauses to appear in the detail information portion 520.

In this example, the selection screen 500 has displayed clauses 1-n for the insurance product A 410 offered by insurance company X. The broker may use the selection screen 500 to select the clauses that are to be included in the formatted submission. In this example, the broker has selected clauses 1, 2, 4 and n to build the formatted submission 550. In contrast, the broker has selected clauses 1, 2, 3, 4 and n to build the formatted submission 580. This example shows that a broker may build a different formatted submission using the template for the same insurance product A. Thus, the broker may build either of the formatted submissions 550 or 580 using the selection screen 500. It should be noted that the formatted submissions 550 and 580 are only a portion of the formatted submission for the insurance product A 410. That is, additional selection screens may be presented to the broker for each of the product components and subcomponents (e.g., product components 420 and 430 and subcomponents 422, 424, 432 and 434).

Referring back to FIG. 3, it was described above that each clause 340 may have specific clause wording 350 and other attributes 360 depending on the form that is used. The submission generation module 240 includes logic that selects the correct form. Similar to that described above for the clauses, the selection of particular clauses and/or attributes for the clauses may result in different forms being selected and displayed for selection to the user by the selection page 500. In a more generic form, this functionality may be described as selecting the correct insurance form based on the underwriting information (including the client's profile and instructions, as well as the applicable insurer) received by the submission generation module 240. Thus, as the broker is stepping through the various selection screens 500 and entering information (or based on underwriting information that is pre-entered for the client), the submission generation module will display the correct form or forms for the clauses to the broker.

After stepping through each of these screens and selecting the clauses and providing information for the attributes, the formatted submission may be considered complete and ready for submission to the insurance company X. However, it should be noted that the template may not be considered to be the complete policy. For example, the client may have specific needs that are not addressed by the components and/or clauses that are included in the template. In such a case, the broker may include additional clauses in the formatted submission (e.g., formatted submission 550, 580). The selection of additional clauses to include in the formatted submission may be accomplished by the submission generation module 240 searching the clauses stored in the database 230 or by manual entry. For example, each clause may include a series of tags or metadata such as product, industry, geography, segment exposure type, etc. The broker may search for additional clauses based on these tags for inclusion in the formatted submission. In another example, the searching may be by phrase or other keyword in the clause language. After determining the specific clause that the client desires, the broker may include this clause and its corresponding attributes in the formatted submission.

It should be noted that the tags, in addition to including the example data listed above, may also include a logic or intelligence to guide the broker through the submission generation process. For example, the tag may include logic that allows the broker to select the most appropriate form or endorsement for the risk. This logic may be based on, for example, the risk profile (e.g., industry, size of client, etc.), the risk exposure (e.g., locations, loss history, valuations, etc.) or the transaction complexity (which may be a holistic view of the risk profile, the risk exposure, the risk appetite of the client, etc). In addition, there also may be multiple levels of tagging based on these sub-factors. The tags may also define service level agreements related to insurance carrier performance based on, for example, the previous year/quarter for continuous improvement, etc.

It should be noted that there may be logic included in the submission generation module that prevents conflicts from occurring based on these newly added clauses that are not part of the original template. For example, some insurance companies may decide that the template is locked and no additional clauses may be added. In other instances, the system, based on the tags or other internal information, may indicate that the clause is incompatible with other types of clauses and cannot be included in the same product.

The formatted submission may also include a portion for the broker to provide comments or annotations for a particular clause. These comments or annotations may include, for example, additional information that may be helpful to the insurance company providing the quote, the reasons for including the particular clause or form in the formatted submission, etc. These comments may be used at a further point in the process to compare the actual quotes to the formatted submission. It is possible to set the comments to be internal to the broker only, i.e., the insurance company receiving the formatted submission may not see the comments.

When the broker has completed all the information for the formatted submission, this completed formatted submission is now ready to be submitted to the insurance company. As described above, the formatted submission included the form of the insurance policy to be issued by the insurance company to which it is being submitted. This formatted submission may include, for example, a declarations page and a series of clauses or terms of the policy. As also described above, the broker may be preparing multiple formatted submissions to send to multiple insurance companies. Thus, the process described above for generating the formatted submission may be performed for each insurance company.

The submission engine 210 also includes a submission module 250. The submission module 250 prepares the formatted submission to be submitted to the insurance company. Depending on the individual insurance company, the submission module 250 will prepare the formatted submission to the desired specifications. For example, one insurance company may receive the formatted submission electronically (e.g., as an XML or other similar file). In another example, the formatted submission may simply be a .pdf document that may be emailed to the insurance company.

In a further example, the submission module 250 may include a carrier portal that allows the insurance carriers to directly access certain information in the submission engine 210. For example, by accessing a carrier portal, the insurance carrier may have access to the formatted submission and all of its components. In addition, as the submission information is updated from the client, the carrier portal may automatically refresh to provide the carrier with the most up to date submission. The carrier portal may also be used by the insurance carrier to provide a quote directly into the carrier portal. The carrier portal may be, for example, hosted by a web server in the submission engine 210 that the client may access using a web browser or may also be a proprietary network such as a virtual private network (VPN), that the client may access using a token provided by the broker.

As described above, the insurance company will receive the formatted submission and determine whether it desires to quote the insurance policy. If the insurance company decides to quote the policy, the insurance company will return the quote to the broker. The quote will include the clauses and attributes that were included in the formatted submission, with any changes proposed by the insurance company.

The submission engine 210 further includes a quote comparison module 260. The quote comparison module 260 is used to generate two comparisons. The first comparison is between the formatted submission and the actual quote that has been returned to the broker. This comparison allows the broker to determine if the insurance company has made any changes to the clauses or other information that was included in the formatted submission. Such changes may affect the coverage that would be provided to the client if the quote was accepted and the broker is in a position to explain these changes to the client. For example, the formatted submission may include a comment by the broker why a particular clause was included. The insurance company may change the clause in the quote and this may affect the type of coverage the client receives or not provide the coverage that the client wants because of the client's specific circumstances or requirements.

The second comparison is between the different quotes received from different insurance companies. As was described above, each of the formatted submissions is based on a product tree. By separating each of the quotes into the product tree (e.g., components and subcomponents), the similar clauses for the quotes from different insurance companies may be determined and compared. Thus, the quote comparison module 260 may display the similar clauses from multiple quotes to the broker. The broker may then review these different clauses and provide advice and documentation to the client as to the differences between the clauses and the exact type of coverage that is being provided by these clauses.

As shown in the step 160 of the renewal process 100, there may be some negotiations with the insurance company or required changes to the submission based on the clauses and other information included in the quote. Based on the quotes, the broker may resubmit the formatted submission or a portion of the formatted submission to the insurance company providing the quote or to other insurance companies, including a request to other insurers to re-quote or quote. The insurance company may similarly re-send the entirety or a portion of the quote such that the submission engine has the most current version of the potential policy.

Once the client has decided on the particular policy and insurance company, the broker will inform the insurance company that the client would like to bind the insurance. However, as described above, there is no need to issue a binder because the submission engine has a copy of the policy in a form that has been agreed to by the client and the insurance company. Thus, the insurance company may generate its final issued policy based on this information and provide the final policy at the time of binding.

Figure 6:
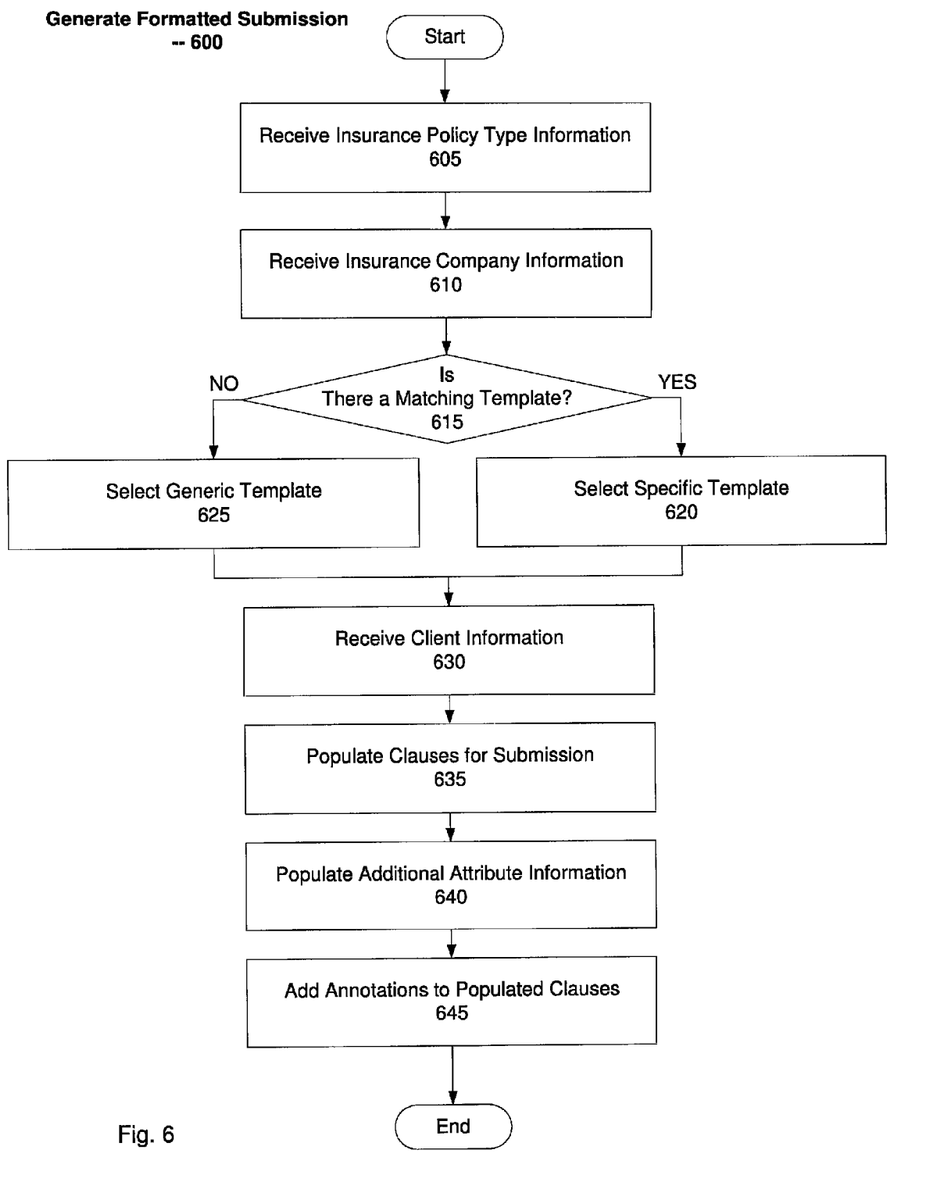
FIG. 6 shows an exemplary method for generating a formatted submission.

FIG. 6 shows an exemplary method 600 for generating a formatted submission. The method is described with reference to the components of the system 200 of FIG. 2. However, those skilled in the art will understand that the exemplary method 600 may be performed by any system capable of executing the functionality described herein. It is also noted that for the purposes of the exemplary method 600, the database 230 is fully populated with the information required to generate the formatted submission, including, policy clauses, policy templates, and client information.

In step 605, the system 200 receives, from a user, a selection of the type of insurance policy that is ready for renewal. The type of insurance may be, for example, workers compensation, general liability, etc. In step 610, the system 200 receives the insurance company information to which the renewal is to be submitted. For example, in steps 605 and 610, a broker may enter this information via the user interface device 208.

In step 615, the submission generation module 240 determines if there is a specific template for the insurance company and type of insurance. If a specific template for the insurance company and type of insurance is stored in the database 230, the submission generation module 240 selects this template in step 620. If no such template exists, the submission generation module 240 selects a generic template for the type of insurance from the database 230 in the step 625. The generic template typically means that the specific insurance company has not provided the broker a specific template for the type of insurance and therefore the broker has defined a generic template for the type of insurance that may be submitted to different insurance companies. As described above, the system may automatically select the appropriate template based on any number of factors such as the product, the product sub-group, the risk exposure (e.g., industry, locations, loss history, value thresholds), transaction complexity, etc.

When the template has been selected, the method continues to step 630 where the system 200 receives the client information from the user. The receipt of the client information may include different aspects of client information. In a first example, the database 230 may include information that is pre-stored for the client. Thus, in such a case, the client information may only include the identification of the client and the submission generation module 240 may retrieve the pre-stored information for the client. In another example, there may be no information stored in the database 230 for the client and the system 200 may prompt the user to provide the client information via the user interface device 208. It should also be noted that the client information that is requested or retrieved may be dependent upon the template that is selected. For example, if the type of insurance is a general liability insurance, the template may require the addresses of all the client's locations. The submission generation module 240 will then retrieve this specific information or prompt the user for this specific information. In another example, the template may require attribute information for the policy such as a deductible. Again, the submission generation module 240 will then retrieve the deductible information for the client from the database 230 or prompt the user for this deductible information. It is noted that not all clauses require attributes.

More generically, the client information or any other information that is requested by the system for generation of the submission will vary based on the product, risk profile, risk exposure, transaction complexity, etc. Once this data is entered for a client, it may be saved and re-used as needed when additional templates are populated with data.

In the next step 635, the submission generation module 240 populates the policy clauses into the formatted submission. The population of the policy clauses may encompass a variety of different population methods. As described above, each template includes a variety of clauses that may be included in the insurance policy that will be issued by the insurance company. In a first example, the selected insurance policy template may include mandatory and optional clauses. Thus, the first type of population may be for the submission generation module 240 to populate the formatted submission with those clauses that are indicated as mandatory in the template.

In a second example, the clauses may have different alternatives based on attribute information. This attribute information may be a specific, attribute for the policy and/or clause such as a deductible, event, exposure, etc. or an attribute of the client such as size of corporation, number of employees, etc. The submission generation module 240 may automatically select one of the clauses based on the attribute information that is stored in the database 230 or entered via the user interface device 208 and populate these automatically selected clauses into the formatted submission.

In a third example, the submission generation module 240 may display some or all of the clauses associated with the template to the user via the user interface device 208. In this example, the user may then select specific clauses to be populated into the formatted submission by the submission generation module 240.

In a final example, the user may perform a search of the clauses included in the database 230. As described above, this search may be based on a tag associated with the clause, by keyword, by phrase, etc. It should be noted that this searching of the clauses does not need to be limited to those clauses that are associated with the template, but may include another subset of clauses or the complete set of clauses in the database 230. The user may then select one or more of the clauses that match the search criteria and the submission generation module 240 will populate the clauses into the formatted submission.

In step 640, any additional attribute information that is needed for the formatted submission is retrieved or requested. For example, a user may select a clause that requires a value for a certain attribute that was not initially collected or retrieved in step 630. This additional attribute information may then be collected and populated into the formatted submission by the submission generation module 240.

In step 645, the user may annotate different clauses with information such as the reason for including the clause, the reason for the attribute value, etc. As described above, this annotation may be viewable in the formatted submission by the insurance company or it may be hidden. At the completion of step 645, the formatted submission will be populated with all the clauses and attribute information and is ready for submission to the insurance company.

It should be noted that the steps and the order of the steps in method 600 are only exemplary and that the steps may be deleted or performed in a different order. For example, the annotation step 645 may be skipped or the receiving of the client information in step 630 may be the first step that is performed. It should also be noted that the above steps describe the generation of a single formatted submission for a single insurance company. In the case of a formatted submission based on a generic template, it may be possible to submit the formatted submission to multiple insurance companies. In the case of a formatted submission that is generated from an insurance company specific template, the formatted submission will generally be submitted to only that specific insurance company. However, the same method 600 may be performed to generate multiple submissions for the same type of insurance for the same client to submit to multiple insurance companies having specific templates.

Figure 7:
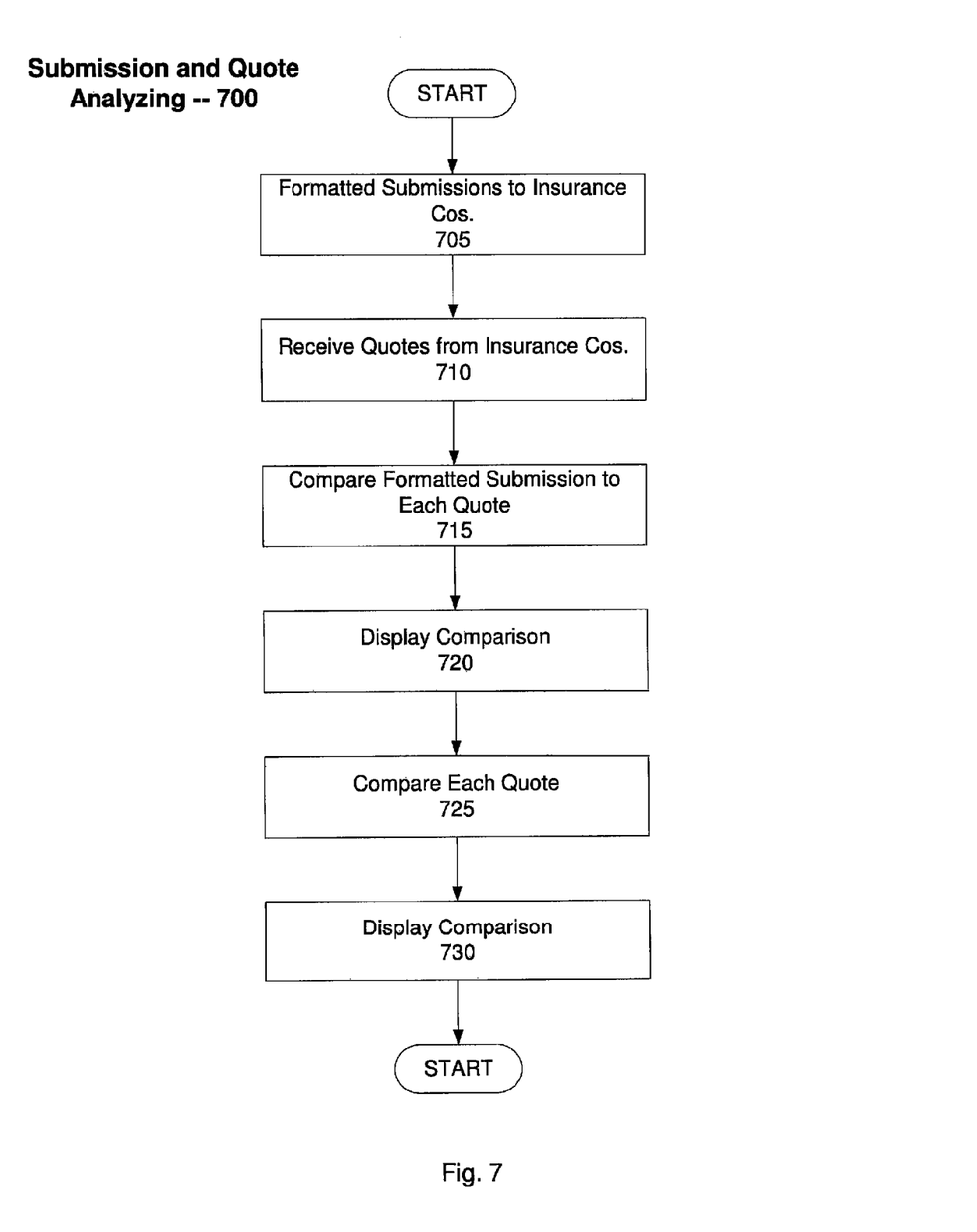
FIG. 7 shows an exemplary method for submitting and analyzing quotes based on the submission.

FIG. 7 shows an exemplary method 700 for submitting and analyzing quotes based on the submission. The method is described with reference to the components of the system 200 of FIG. 2. However, those skilled in the art will understand that the exemplary method 700 may be performed by any system capable of executing the functionality described herein. It is also noted that the formatted submissions discussed with reference to the method 700 are the formatted submissions generated with reference to the method 600.

In step 705, the submission module 250 of the submission engine submits the formatted submission to the insurance companies selected by the user. As described above, the formatted submissions will be generated using the insurance company specific template for those of the selected insurance companies that have such a template or a generic (or other) template for the selected insurance companies that do not have a specific template. As also described above, a client may select multiple insurance companies to which to submit the formatted submission. However, it is not a requirement as only one formatted submission may be submitted in step 705. As described above, the submission in step 705 may be via email, electronic document transfer, web submission, generating a printout of the formatted submission, etc.

It should be noted that the submission module 250 or another module of the submission engine 210 may include a document repository that allows for the tracking (e.g., date/time stamps) as to when submissions were sent to insurance carriers and when the corresponding quotes were received. This tracking allows the broker to keep track of scenarios where there is one program that is quoted by many insurance carriers. This also allows the broker to date stamp and monitor Service Level Agreements (SLAs) that may be incorporated into panel or other arrangements. For example, the members of the panels may have to meet minimum requirements to remain on a panel, for example, a minimum time for quote turn around after receiving a submission. The tracking tool will allow the broker to monitor such requirements.

In step 710, the submission module 250 receives quotes from some or all of the insurance companies to which the submission was sent in step 705. The quotes may be received in the same or a different manner as the submission, e.g., email, documents transfer, etc. The quotes will likely have the same general format as the formatted submission. As described above, the formatted submission will generally be in the format of an insurance policy including the relevant clauses and corresponding attributes for the clauses.

In step 715, the quote comparison module 260 will compare each quote to the formatted submission. It should be noted that the clauses may include an indexing to facilitate comparison. For example, the insurance company may completely replace a specific clause from the submission. However, the clause may have a certain index that indicates to the quote comparison module 260 that the replacement clause corresponds to the deleted clause for comparison purposes. In another example, the quote comparison module 260 may use word searching or another machine learning algorithm to identify a type of the clause in the quote so that it may be compared to the corresponding clause from the formatted submission.

In step 720, the quote comparison module 260 may output the comparison results to the user, e.g., via the user interface device 208. The user may then view the results of the comparison. This output may include such outputs as a redlined change document showing the differences between the formatted submission and the quote, an identification of the specific clauses where changes have been made, etc. The quote comparison module 260 may also categorize and/or prioritize the differences for display or output to the broker. For example, a simple categorization may divide the differences between a first category of clauses where numerical or monetary values differ and a second category of clauses where textual changes have been made. In a further example, the category of textual changes may be subcategorized based on the number or percentage of words in the clause that differ between the submission and quote. Those skilled in the art will understand that these are only examples and that other more sophisticated types of categorization may also be used such as using a rule-based engine or natural language engine to detect specific types of changes.

The quote comparison module 260 may also prioritize these differences for the broker. For example, the quote comparison module may include rules that prioritize the differences based on the categories described above. In another example, the prioritization may depend on the specific clause to which a change was made, e.g., the broker has deemed and defined certain clauses to be more important or have a higher priority than other clauses. These categorizations and priorities may vary depending on, for example, client, product, risk profile, risk exposure, transaction complexity, etc. This categorization and prioritization of the differences will allow the brokers to resolve the higher priority differences in a timely manner.

The quote comparison module 260 may also categorize or prioritize the differences based on the SLAs or other pre-negotiated arrangements the broker has with the insurance carrier that submits the quotes. For example, a particular insurance company may have agreed to certain pre-negotiated terms for a particular clause. If there is a difference between the submission and the quote, the quote comparison module 260 may identify this difference to allow the broker to monitor carrier adherence to pre-negotiated terms for continued improvement of panel arrangements. Thus, the SLAs that are indexed to different insurance carriers and policy types may also be stored in the database 230 to facilitate this type of comparison between the submissions, quotes and SLAs or other pre-negotiated terms. In step 725, the quote comparison module 260 compares the different quotes received from the different insurance companies. This comparison may be performed in the same manner as described above in step 715 for the comparison of the quote to the formatted submission. In step 730, the quote comparison module 260 will output the difference between the quotes so the user may see the differences between the various quotes.

The comparisons described above is between the formatted submission and the quotes received from the insurance companies and the quotes between the different insurance companies. However, the comparisons that are performed by the quote comparison module 260 may be more granular. For example, the quotes may be compared across different layers, by quota participations (e.g., for multi-policy programs) and across programs (e.g., Auto Liability vs. Excess/Umbrella) to allow the broker to see these differences. This allows a broker to analyze these differences to identify non-concurrencies which allows an experienced broker to place risk transfer to meet the holistic needs of the client's risk exposure/profile and risk appetite, etc.

It should be noted that the submission and quote process 700 may be repeated several times as the submission engine 210 may generate updated formatted submissions based on discussions between the client, the broker and the insurance company. This, in turn, will lead to updated quotes and updated comparisons.

In addition, it should be noted that the above described comparison is between the formatted submission and the corresponding quotes received in response to the formatted submission. However, there may also be other comparisons that can be made using the same general process. For example, as described above, after the quotes are received, the client will decide which quote to accept and the broker will communicate this decision to the insurance company, which will, in turn, submit the actual insurance policy to the client via the broker. The submittal of the actual insurance policy by the insurance company may follow the same process as the submission of the quote, e.g., by submitting via data collection module 220. Since the database 230 includes the quote submitted by the insurance company, the quote comparison module 260 may now compare the actual insurance policy to the quote to determine if there are any differences between the quote and the actual insurance policy. This comparison may be performed in the same manner as described above for comparing the formatted submission and the quotes.

As described above, the database 230 may also store SLAs or agreements for the insurance company. These SLAs will include various terms that have pre-negotiated between the broker and the insurance company. These terms may include, for example, time limits in which the insurance company must submit information (e.g., time from submission to quote), the language of specific clauses, etc. As described above, the quote comparison module 260 may compare the terms of the SLA to the characteristics or terms of the quote. However, the SLA may also cover additional terms between the broker and the insurance company and the quote comparison module 260 may compare the characteristics or terms of additional items received from the insurance company to the SLA in the same manner. These additional items for comparison to the SLA may include, for example, adherence to agreed policy forms, accuracy of actual insurance policies, mid-term endorsements, loss summaries, engineering reports, loss control reports, workers compensation experience modifications, etc. Again, these comparisons may be performed in the same manner as described above for the SLA and the quote.

One advantage of the comparisons of SLAs and the performance of the panel members against these SLAs is that the broker can continually work to improve terms and conditions for the client and adjust the panel as needed. In addition, the performance of the panel members may be benchmarked against non-panel members and be evaluated for their compliance with SLAs.

The submission engine 210 may be integrated into a client portal to allow the broker to share information with the client. For example, the client may view renewal timelines or progress during the renewal period, view updated insurer responses (e.g., quotes, declinations, indications, no response as quotes), view the above-described comparisons between quotes, view bound policy details and policy documents with transmittal letters arrive from insurance carriers. In addition, the client portal may also allow for the client to provide updated or new information to the broker, for example, named insured, renewal applications, exposure/valuation updates, marketing approach, list of insurers to be approached, terms and conditions sought, risk identification questionnaires, auto-renewal criteria (e.g., whether the client is eligible for auto-renewal based on loss history, changes in exposure, product, etc.), etc. The client portal may be, for example, hosted by a web server that the clients may access using a web browser or may also be a proprietary network such as a virtual private network (VPN), that the clients may access using a token provided by the broker. As updated information is received from the client, the information in the carrier portal may be automatically revised to reflect the updated information.

The client portal may be integrated with submission engine 210 to allow the broker to exchange information with the client. For example, the client may view renewal timelines or progress during the renewal period, view updated insurer responses (e.g., quotes, declinations, indications, no response as quotes), view the above-described comparisons between quotes, view bound policy details and policy documents with transmittal letters arrive from insurance carriers. In addition, the client portal may also allow for the client to provide updated or new information to the broker, for example, named insured, renewal applications, exposure/valuation updates, marketing approach, list of insurers to be approached, terms & conditions sought, risk identification questionnaires, auto-renewal criteria (e.g., whether the client is eligible for auto-renewal based on loss history, changes in exposure, product, etc.). In addition, it may also be possible to connect the functionality of the client portal and carrier portal. The client portal and carrier portal may be linked with the submission engine such that information is seamlessly exchanged between client, broker and insurer.

A carrier portal may also be integrated with submission engine 210 to allow carriers to exchange and track relevant information required during the quote negotiation process. Using the carrier portal, an insurer may indicate its interest to bid on a certain segment of the broker's upcoming renewal business and submit quotes to the broker. Insurer's interest in a specific segment (such as Industry, Geography, Product etc) may be made available through the carrier portal to submission engine 210 to help the broker identify list of insurers to be approached. Once the broker sends the submission to insurers, insurers may be able to view the submission package on the carrier portal, including a request for quote by the broker. Through the carrier portal, the insurer may also view requested policy forms and clauses, along with supporting information (loss history, inspection reports, exposure summary, risk questionnaires etc) that may be required in order for the insurer to price the requested policy. In addition, the insurer may be able to download such information from the carrier portal and to use the carrier portal to provide a quote to the broker for the requested policy. The insurer would, through the carrier portal, use the submission engine to view/change terms and conditions of the requested policy and include premium, fees, applicable taxes etc. Using the carrier portal, the insurer may also be able to request the broker to provide additional information required in order to prepare/price the quote.

Those skilled in the art will understand that the above-described exemplary embodiments may be implemented in any suitable software or hardware configuration or combination thereof. In a further example, the exemplary embodiments of the systems and methods for evaluating a program of an business may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
   storing, in a database, a first submission for an insurance policy, the first submission comprising a plurality of insurance policy clauses and attribute information for an entity that desires to purchase the insurance policy;
   preparing, by a submission module that is executed by a processor, the first submission in a format required by a first insurance company;
   submitting, via a network, the first submission to the first insurance company, the submitting including a request for the insurance policy;
   receiving, from the first insurance company via the network, first response information related to the first submission, the first response information comprising the requested insurance policy;
   storing, in the database, the first response information;
   retrieving, by the processor, the first submission and the first response information from the database;
   comparing, by a comparison module that is executed by the processor, the first response information to the first submission; and
   outputting comparison data that shows differences between the first response information and the first submission to identify differences between the first response information and the first submission.

2. The method of claim 1, wherein the first response information from the first insurance company is a quote corresponding to the first submission, the quote includes quote insurance policy clauses corresponding to the insurance policy clauses in the first submission, wherein the comparing includes:
   comparing each quote insurance policy clause to the corresponding insurance policy clause in the first submission, wherein the comparison data is the insurance policy clauses from the first submission and the corresponding quote insurance policy clauses that are identified as different.

3. The method of claim 2, wherein the comparing further includes:
   determining a correspondence between each insurance policy clause in the first submission and each quote insurance policy clause based on an index value included in each of the insurance policy clauses in the first submission and the quote insurance policy clauses.

4. The method of claim 2, further comprising:
   categorizing the comparison data based on a type of differences between the insurance policy clauses in the first submission and the quote insurance policy clauses.

5. The method of claim 4, wherein the type of differences include one of a textual difference between clauses, a numerical difference between clauses, a monetary difference between clauses, an amount of textual differences between clauses, and an identification of the clauses that include differences.

6. The method of claim 4, further comprising:
prioritizing the comparison data based on the type of differences; and
displaying the prioritized comparison data.

7. The method of claim 2, further comprising:
receiving an actual insurance policy corresponding to the quote, wherein the actual insurance policy includes a plurality of actual insurance policy clauses;
comparing each quote insurance policy clause to the corresponding actual insurance policy clause; and
identifying the actual insurance policy clauses that are different from the corresponding quote insurance policy clauses.

8. The method of claim 2, wherein the comparing further includes one of a comparison across layers, a comparison across quota participation and a comparison across programs.

9. The method of claim 1, further comprising:
storing, in the database, a service level agreement for the first insurance company, wherein the service level agreement is a negotiated agreement between the first insurance company and an insurance broker, the service level agreement including negotiated insurance policy clauses that the first insurance company has agreed to use when quoting insurance policies for the insurance broker or negotiated performance terms that the first insurance company has agreed to meet when quoting insurance policies for the insurance broker; and
comparing the first submission, the first response information and the service level agreement, wherein the comparison data includes differences between the first response information and the service level agreement to identify instances in which the first insurance company failed to comply with the service level agreement.

10. The method of claim 9, wherein the first submission includes a first time at which the first submission was submitted to the first insurance company and the first response information received from the first insurance company includes a second time at which the first response information was received from the first insurance company, the method further comprising:
determining an elapsed time based on the first time and second time.

11. The method of claim 10, wherein the service level agreement includes an elapsed time negotiated performance term, the method further comprising:
comparing the elapsed time to the elapsed time negotiated performance term.

12. The method of claim 9, wherein the first response information received from the first insurance company is a quote including a plurality of quote insurance policy clauses, the method further comprising:
comparing the quote insurance policy clauses to corresponding negotiated insurance policy clauses in the service level agreement; and
identifying the quote insurance policy clauses that are different from the corresponding negotiated insurance policy clauses.

13. The method of claim 1, further comprising:
storing, in a database, a second submission for the insurance policy, the second submission comprising a second plurality of insurance policy clauses and second attribute information for the entity that desires to purchase the insurance policy;
preparing, by the submission module that is executed by the processor, the second submission in a format required by a second insurance company;
submitting, via the network, the second submission to the second insurance company, the second submission comprising a second request for the insurance policy;
receiving second response information from the second insurance company related to the second submission, the second response information comprising the second requested insurance policy;
comparing, by the comparison module that is executed by the processor, the second response information received to the second submission; and
outputting second comparison data that shows differences between the second response information and the second submission to identify differences between the second response information and the second submission.

14. The method of claim 13, further comprising:
comparing the first response information from the first insurance company to the second response information from the second insurance company; and
outputting differences between the first response information and the second response information.

* * * * *